United States Patent [19]

Nilsson

[11] 4,222,619
[45] Sep. 16, 1980

[54] DEVICE FOR TRANSFORMING A ROTATIONAL MOVEMENT INTO A LINEAR MOVEMENT

[75] Inventor: Sven W. Nilsson, Partille, Sweden

[73] Assignee: SKF Nova AB, Goteborg, Sweden

[21] Appl. No.: 15,043

[22] Filed: Feb. 26, 1979

Related U.S. Application Data

[63] Continuation of Ser. No. 817,148, Jul. 20, 1977, abandoned.

[30] Foreign Application Priority Data

Sep. 6, 1976 [SE] Sweden .............................. 7609795

[51] Int. Cl.³ ....................... F16H 21/16; F16C 19/04
[52] U.S. Cl. ................................ 308/176; 308/189 R; 74/25
[58] Field of Search ...................... 308/26, 176, 184 R, 308/189 R, 207 R; 74/25

[56] References Cited

U.S. PATENT DOCUMENTS

| | | | |
|---|---|---|---|
| 2,940,322 | 6/1960 | Uhing | 74/25 |
| 3,589,202 | 6/1971 | Stanley | 74/25 |
| 3,937,089 | 2/1976 | Gärtner | 74/25 |
| 3,966,280 | 6/1976 | Olrick | 308/176 |
| 3,977,258 | 8/1976 | Bauer | 74/25 |
| 4,008,929 | 2/1977 | Olrick | 74/25 |
| 4,141,255 | 2/1979 | Nilsson | 74/25 |

FOREIGN PATENT DOCUMENTS 234454  7/1964  Austria ........................................ 74/25

*Primary Examiner*—Richard R. Stearns
*Attorney, Agent, or Firm*—Eugene E. Renz, Jr.

[57] ABSTRACT

A device for transforming a rotational movement into a linear movement. The device comprises a retainer and a shaft extending through the retainer which are mounted for movement relative to one another. A plurality of annular bearing members, in the illustrated embodiment, comprising ball bearings, circumscribes the shaft and engages the same at axially spaced locations. The bearings are mounted for tilting movement relative to the shaft. The outer ring of each of the bearing assemblies is supportd in a housing and each housing has an external surface section defined by a circular arc having a center on the rotational axis of the housing which slidingly engages internal walls of the retainer of complementary form.

6 Claims, 4 Drawing Figures

DEVICE FOR TRANSFORMING A ROTATIONAL MOVEMENT INTO A LINEAR MOVEMENT

This is a continuation of application Ser. No. 817,148 filed July 20, 1977 entitled A DEVICE FOR TRANSFORMING A ROTATIONAL MOVEMENT INTO A LINEAR MOVEMENT and now abandoned.

BACKGROUND OF THE INVENTION

The present invention relates to a device for transforming a rotational movement into a linear movement.

A typical prior art device of this type is shown in Uhing U.S. Pat. No. 2,940,322 issued June 14, 1970 entitled ROTARY TRANSLATORY DRIVE GEAR. This device comprises an elongated casing having a rotatable shaft extending therethrough and a series of rings mounted in the casing having a bore diameter larger than the diameter of the shaft and contacting the shaft at axially spaced locations. The rings are the inner ring of ball bearings. Means in the form of intermeshing gears are provided to selectively rotate the inner rings to vary the angular position in relation to the shaft. By this arrangement with the rotational axis of the rotatable inner rings disposed at an angle to the shaft axis, there results as a consequence of the speed of rotation of the shaft and the speed of rotation of the rings, a shift thrust component acting between the shaft and the rings extending axially of the shaft. This component therefore will affect axial movement of the casing on the shaft upon rotation of the shaft or rotation of the shaft upon axial movement of the casing. The bearings are pivotally supported in the casing by pads at diametrically opposed locations which mount pins extending through the casing wall.

An important consideration in devices of this type is the mounting arrangement for the bearings to facilitate tilting or skewing in the casing or retainer in a simple and reliable manner. Furthermore, these components should possess sufficient physical strength in a relatively simple assembly so that it is also economical to manufacture.

SUMMARY OF THE INVENTION

The purpose of the present invention is to provide a device which is easily assembled, comprises components which can be manufactured in a simple and economical manner and which in operation has high tensile strength and accuracy. This is achieved in accordance with the present invention by providing housings in the form of annular members for each of the bearings which have an exterior peripheral surface defined by circular arcs having centers on the rotational axis of the housing and which slidingly engage complementary surface sections in the retainer. In this manner a very rigid device is provided whose parts can be manufactured and assembled in a simple manner and which by reason of the large contact area of the annular housing and the retainer provides a high capability for withstanding the axial loads encountered during operation of the device.

BRIEF DESCRIPTION OF THE DRAWINGS

These and other objects of the present invention and the various features and details of the operations and construction thereof are hereinafter more fully set forth with reference to the accompanying drawings, wherein.

DESCRIPTION OF A PREFERRED EMBODIMENT

Figure 1:
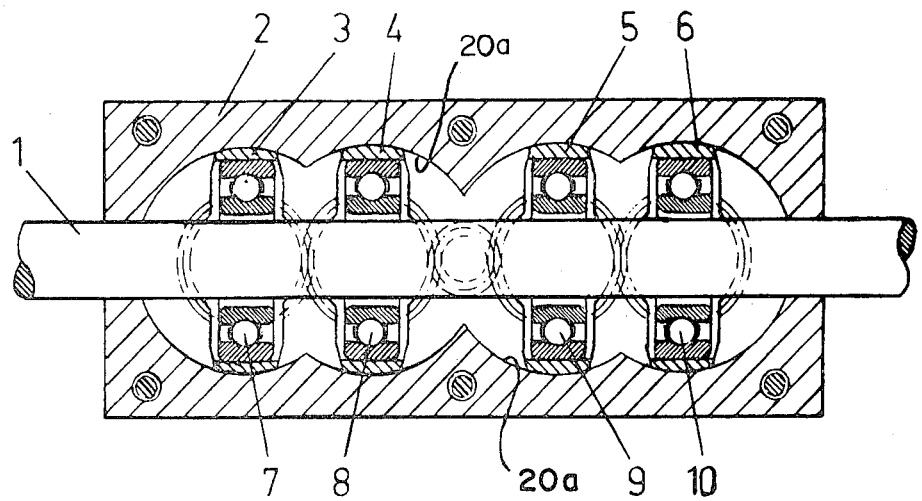
FIG. 1 is a transverse sectional view of a device embodying the improvements of the present invention taken on lines 1—1 of FIG. 3.
Figure 2:
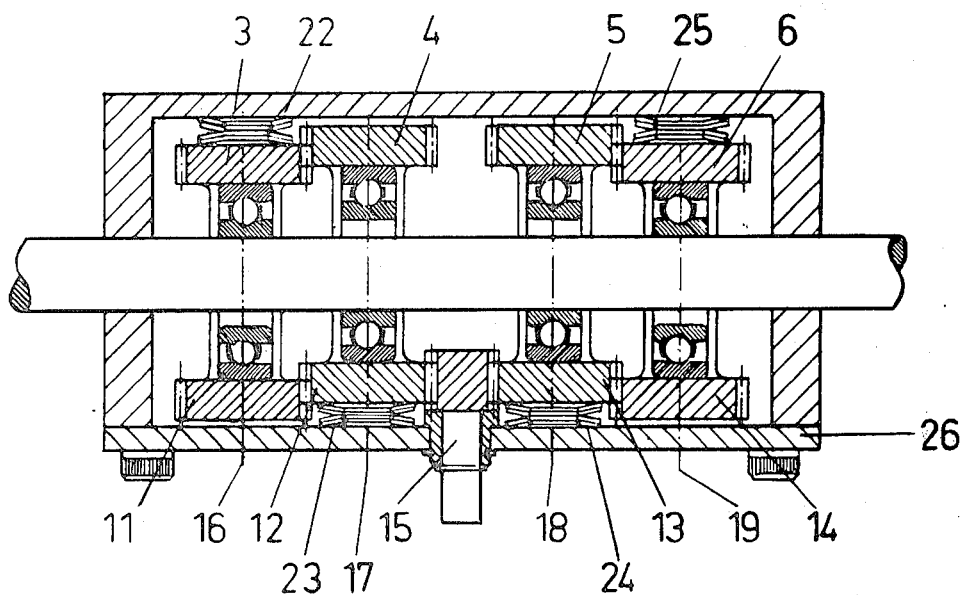
FIG. 2 is a transverse sectional view taken on line 2—2 of FIG. 3.
Figure 3:
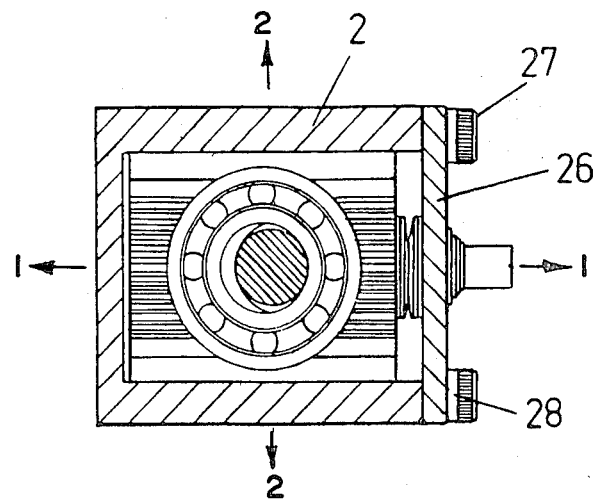
FIG. 3 is an end elevational view of the device of the present invention with the end wall removed to show the internal construction more clearly.

Referring now to the drawings and particularly FIGS. 1 and 2 thereof, there is illustrated a device for transforming a rotational movement into a linear movement constructed in accordance with the present invention. As illustrated, the device comprises a shaft engaging through an elongated housing or retainer 2 and includes means for effecting either rotational movement of the shaft upon axial displacement of the housing or axial displacement of the housing on the shaft upon rotation of the shaft. In the present instance, this means consists of a series of annular bearing members, in the present instance, ball bearings 7, 8, 9 and 10, the inner rings of which encircle the shaft 1 and which as illustrated have a bore diameter greater than the diameter of the shaft. The bearings are supported in four housings identified by the numerals 3, 4, 5 and 6. The housings as illustrated completely circumscribe the bearings (see FIG. 4). The walls of the inner ring bores are preferably chamfered to allow the bearings to be tilted or skewed in relation to the shaft 1. As illustrated the housings are interconnected by intermeshing gear segments so that the housings or annular members tilt together as a unit. The interconnection and the common tilting or skewing are in the embodiment illustrated achieved by providing the housings with gear pinions 11, 12, 13 and 14 which intermesh with each other and with a pinion equipped tilting or skewing member 15 extending through a wall of the retainer. By this arrangement rotation of the actuating member 15 turns the housings 3, 4, 5 and 6 about their rotation axes 16, 17, 18 and 19.

In order to effect the desired contact between the inner rings of the bearings and the shaft 1, the housings 3, 4, 5 and 6 are biased by cup springs 22, 23, 24 and 25 mounted between the inner wall of the retainer as illustrated in FIG. 2. By this arrangement the housings are spring loaded along their rotational axis. The springs are preferably centered on pins which can be fitted into the retainer or mounted on the housings. In order to obtain balance in the retainer 2, the two outer housings 3 and 6 are loaded in opposite directions relative to the inner housings 4 and 5. A relative displacement of the housings in the direction of the spring load is allowed by making the gear pinions, the housing surface sections 20 and 21 (FIG. 4) and the corresponding retainer surfaces 20a of the cylindric shape.

Figure 4:
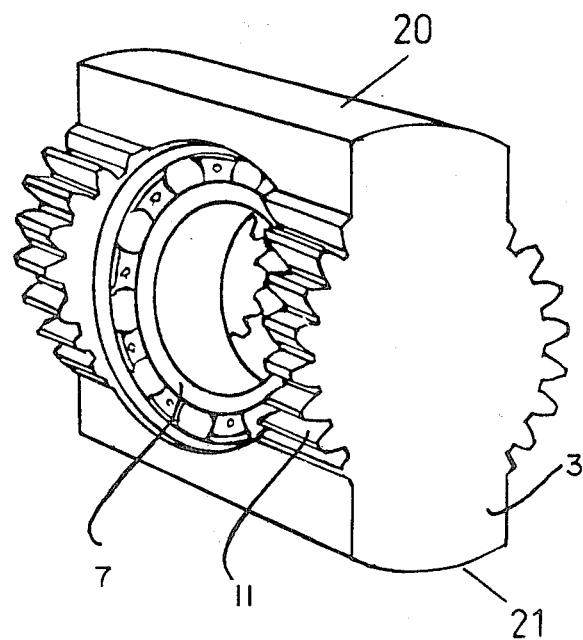
FIG. 4 is a perspective view of the annular housing for the bearings.

In accordance with the present invention each of the housings is provided with two surface sections defined by arcs having their center located on the rotational axis of the housing. The structure is best illustrated in FIG. 4 wherein the reference numerals 20 and 21 are the arcuate sections of a housing for example the housing 3. These arcs are segments of a circular cylinder. These surfaces slidingly engage in complementary arcuate wall portions 20a formed on the interior surface of the retainer as best illustrated in FIG. 1. Thus the generatrices of the arcuate sections 20, 21 envelope the annular bearing member 7 and as illustrated in FIG. 1 have a center located on the rotational axis for the bearing member. By this specific configuration the housings can be revolved, turned or skewed in the retainer in such a manner that the axes of the bearings form angles of various magnitude with the shaft axis. Shaft 1 runs through the bore of the bearing 7 perpendicularly to the generatrices of the surfaces 20, 21 which as noted are segments of a circular cylinder.

Even though the gear pinions are illustrated as being formed integrally with the housings (see FIG. 4), it is, of course, possible to use separately manufactured gear pinions which then are suitably secured to the housings. Furthermore by providing each housing with gear pinions at opposite ends, (see FIGS. 2 and 4) an additional actuating member similar to the member 15 may be provided by the opposite side of the retainer to avoid exposure of the housings to torsional movements when they are acted upon from the revolving member via the gear pinions.

The parts of the device according to the present invention can be manufactured and assembled in a simple manner to provide a relatively rigid unit. For example, the retainer 2 can be made by drilling a number of cylindrical apertures in a retainer blank of for example, rectangular cross section. By this construction the other parts of the assembly such as the housings, springs and actuating member 15 can be inserted from the open side of the retainer and thereafter a cover member 26 placed over the open end and secured thereto by means of screw fasteners 27 and 28. The housings will automatically take up their correct position as they are moved into the cylindrical apertures of the retainer. As illustrated in FIG. 4, the housings preferably have a substantially cylindrical envelope surface, so that the generatrix of the cylinder is parallel to the rotational axes of the housings. Blanks for the housings can therefore be manufactured by extruding profiled bars which are then cut into appropriate lengths. The circular-cylindrical surface sections 20, 21 and the cog profile can the be formed in the extrusion procedure and the bore for mounting the bearing can be formed by a simple drilling operation through the housing blanks in a direction perpendicular to the direction of the extrusion.

Even though a specific embodiment of the present invention has been illustrated and described herein, changes and modifications may be made within the scope of the following claims. For example sliding bearings may be used in lieu of rolling bearings which are for example, in the form of a simple ring which is rotatably arranged but axially fixed in each of the housings 3, 4, 5 and 6. Furthermore the rotation of the housings can be achieved by means other than the interconnecting gear pinions. For example, it is possible to use linkage or connecting bar arrangements. Friction wheels, chains or driving belts may also be another alternative. Additionally instead of using a separate actuaing member 15, it is possible to directly interconnect all of the housings and provide one with an integral skewing or tilting actuator.

What is claimed is:

1. In a device for transforming a rotational movement into a linear movement comprising a shaft, a retainer circumscribing the shaft and moveable axially thereof, a plurality of annular bearing members encircling the shaft and each having a surface portion confronting and engaging the peripheral surface of the shaft at axially spaced locations, a housing for each bearing member tiltable about a predetermined tilting axis, each annular bearing member rotatable about its own axis, enclosing said shaft and supported in a respective housing, means mounting the housings in the retainer including means for tilting the housings and annular bearing members relative to the shaft, the improvement comprising means defining external surface sections formed integrally with each housing defined by circular arcs having their centers located on the tilting axis of the housing, said surface sections slidingly engaging interior retainer walls of complementary form.

2. A device as claimed in claim 1 including means interconnecting the housings comprising intermeshing cog segments formed integrally with each housing.

3. A device as claimed in claim 1 wherein the external surface sections of each housing are defined by the generatrix of a cylinder parallel to the tilting axis of the housing.

4. A device as claimed in claim 1 wherein each housing is of unitary one-piece construction.

5. A device as claimed in claim 1 including spring biasing means disposed between the housings and retainer to urge the annular bearing members against the shaft.

6. In a device as claimed in claim 1 wherein each said housing completely circumscribes its annular bearing member.

* * * * *